Dec. 26, 1933.  A. I. MARCUM  1,940,914
COMPENSATING SUSPENSIONS FOR MULTIWHEEL VEHICLES
Filed Jan. 28, 1930  2 Sheets-Sheet 2
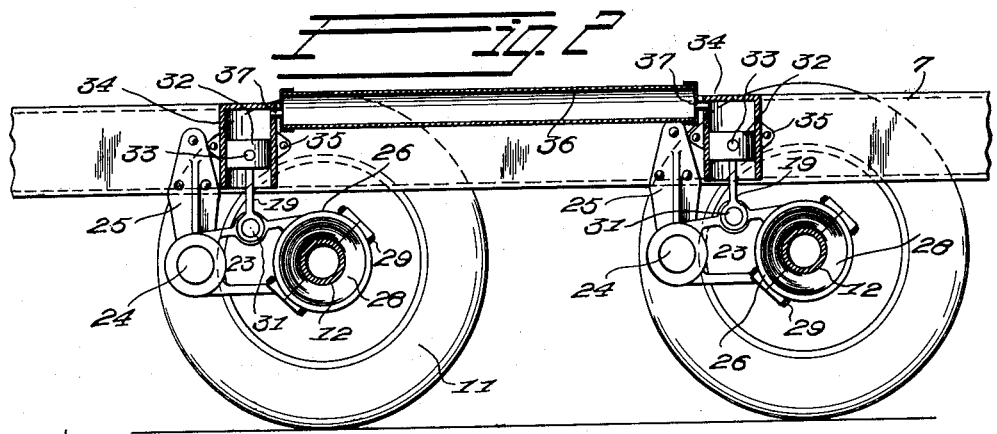
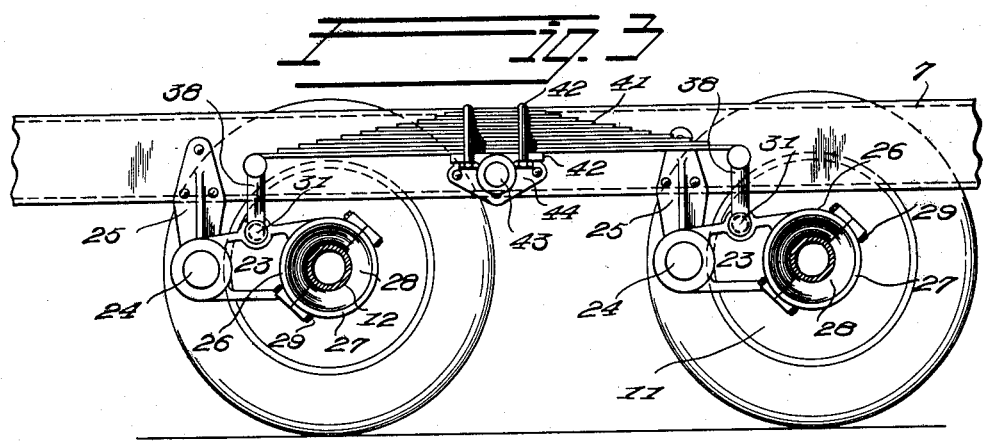
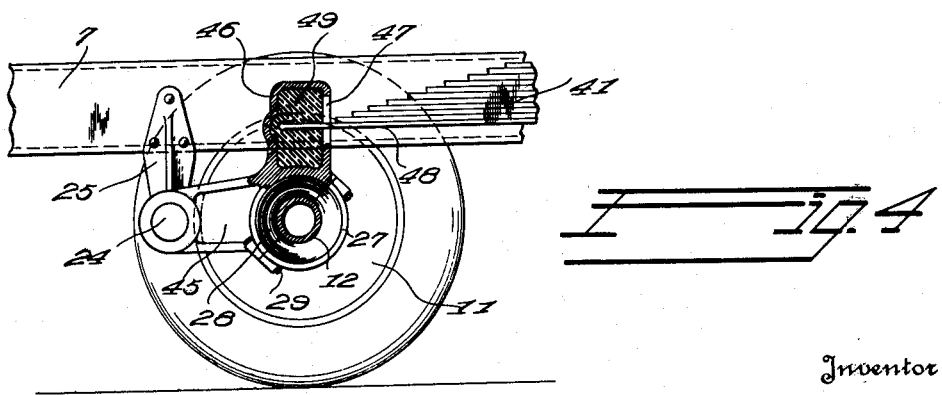
Inventor
Arthur I. Marcum
By Strauch & Hoffman
Attorneys Patented Dec. 26, 1933

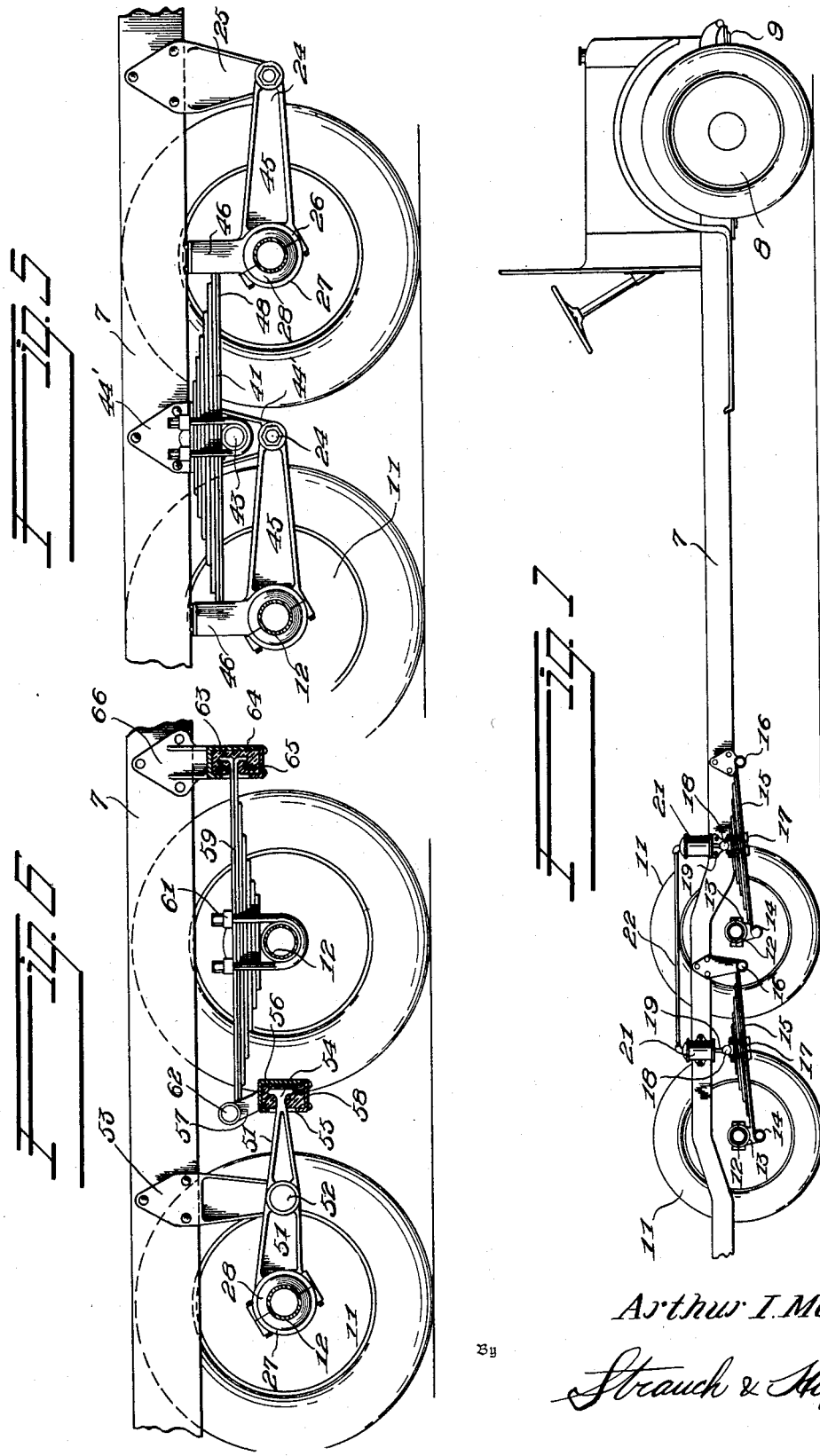

1,940,914

UNITED STATES PATENT OFFICE 1,940,914

COMPENSATING SUSPENSIONS FOR MULTI-WHEEL VEHICLES

Arthur I. Marcum, Oakland, Calif., assignor, by mesne assignments, to Automotive Engineering Corporation, a corporation of Delaware Application January 28, 1930. Serial No. 424,073

10 Claims. (Cl. 280—104)

This invention relates to suspension systems for multi-wheel vehicles, particularly those of the type wherein a pair of closely spaced tandem axles is arranged at one or both ends of the vehicle frame, and wherein the tandem axles of each pair are connected with each other and to the frame in such manner that the load is properly divided upon the axles and that a portion of each road shock received by one axle is immediately transmitted to the other axle.

Several general types of suspension systems having the above characteristics have heretofore been proposed. One of them embodies a set of suspension elements interconnecting the axles and attached to the frame at a plurality of points, but such a design is generally either too flexible or too complicated. Other, and much more satisfactory, types are those in which the inter-connecting elements are relatively few in number and attached to portions of the frame at no more than two or three points, depending upon the arrangement of said elements in combination. Another type, and one which is particularly adapted for pleasure vehicle and bus work, is that involving pneumatic or hydraulic equalizers for interconnecting the tandem axles. Such devices are susceptible to various interpretations as to method of attachment to the frame and may be considered either as two, three or four point suspensions, although in principle they more closely approach the three point type.

In the above respects this application represents a continuation in part of the inventions disclosed in my copending application Serial No. 68,298, filed November 11, 1925, now Patent #1,745,432, granted February 4, 1930.

Heretofore, it has been standard or common practice to build suspensions entirely, or in greater part, from metal springs and metal links and shackles. Combinations of such elements, particularly in multi-wheel suspensions of the compensating type, are rather expensive and are apt to result in the attainment of undesirable flexibility such, for example, as lateral shifting of the axles to produce drag on the tires. Furthermore, the rigid links and shackles tend to restrict certain phases of the flexibility otherwise permitted as by twisting the spring leaves when the axles tilt transversely.

It is a primary object of this invention to eliminate the foregoing disadvantages by replacing certain of the spring beams with rigid beams or arms and by replacing the conventional links and shackles with connecting devices containing rubber in which the ends of the beams or arms may be embedded. The number of substitutions made will depend upon the type of suspension under consideration, the use to which the vehicle is to be put and the conditions of the roads over which the vehicle will normally be driven. The rubber connections serve to prevent twisting of the springs and breakage of the rigid beams, and to absorb and cushion portions of the road shocks. In addition to rubber shackles, rubber blocks may be utilized at other points, as at the axle interconnecting points to cushion shocks and to permit unhampered tilting movement of the axles.

It is another object of this invention to incorporate compensating devices of an elastic or hydraulic type in the suspension systems and, in some cases where the elastic medium consists of air, to utilize expansible chambers interconnected by a pulsation or compensation reservoir that has a relatively great volumetric capacity in order to effect a smooth and delayed shock transmission from one axle to the other, and to give the suspension proper resilience when both tandem wheels on the same side of the vehicle are submitted to simultaneous separate shocks. I prefer, when utilizing elastic compensating devices, to connect them at points between the axles and the axes of oscillation of the latter, whereby the vertical frame movement is much less than the up and down movement of the wheels and axles when passing over road irregularities. If the elastic medium is air, and especially when a pulsation reservoir is used, the frame movement is still further reduced by virtue of the compressibility of the air.

Other objects of my invention are to provide novel load supporting mechanisms operating under the three-point suspension principles; and to design a two-point suspension which shall embody most of the desirable features of the compensating three-point type.

Further objects of the invention will become apparent from a study of the following detailed description when taken in connection with the accompanying drawings, in which:

Figure 1 illustrating in side elevation, a preferred form of the invention, shows a road vehicle chassis equipped with an elastic compensating suspension, the near tandem wheels having been removed for purposes of clarification.

Figure 2 constitutes a modification of the chassis of Figure 1, with the elastic equalizer shown in section and with one end of the chassis cut off to eliminate duplicated matter.

Figure 3 represents a further modification, the pneumatic equalizer of Figure 2 having been replaced by a compensating beam.

Figure 4 shows a still further modification, partially in section, with rubber connectors substituted for the shackles of Figure 3.

Figure 5 discloses a modified arrangement of the parts of the device of Figure 4.

Figure 6 illustrates another modification, wherein a two-point suspension is evolved from the three-point types in the other figures.

It will be understood and obvious that the illustrated suspensions may be incorporated in six, eight or multiple wheeled vehicles, under either end or any portion of the chassis frame; and that the axles may be of either the full transverse or stub type, with each or any axle driven or idle, as desired. The drive may be either sprung or unsprung. In the case of driven or braked axles, the torque reactions may be neutralized by devices (not shown) in any conventional or suitable manner.

Referring now to the drawings in which like reference numerals designate like parts, numeral 7 indicates the chassis frame of a vehicle, supported at its forward end in a conventional manner by a wheel and axle assembly 8 and leaf springs 9, and at its rear end by closely spaced tandem wheels 11, axles 12, and a compensating suspension constructed and arranged as follows:

At each side of the vehicle frame each axle carries a depending hanger 13 to which is pivoted, as at 14, one end of a beam 15 which may be a leaf spring, as shown, or a rigid arm. The forward ends of beams 15 are directly pivoted, as at 16, to rigid bracket portions of the frame. Intermediate its ends each spring beam has clamped thereto a U-bolt saddle structure 17, and the latter is pivotally connected, as at 18, to a piston rod 19. The piston rods are pivotally received in the lower sides of pistons (not shown in Figure 1 but illustrated in Figure 2) which are adapted for reciprocation in vertically arranged cylinders 21, that are rigidly secured to the frame. The cylinders are closed at their upper ends and the working spaces of the pair of cylinders at each side of the frame are placed in communication with each other by a conduit 22.

The working fluid may be a liquid but preferably is a compressed gas, such as air. It will be seen that road shocks received by any one of the tandem wheels will be partially absorbed in the spring beam, partially absorbed in the gas above its corresponding piston, and partially transmitted to the other tandem wheel on the same side of the vehicle by way of the fluid interconnection and the other spring beam. In this way the shocks, the load on the axles, and the spring deflections are equalized by the arrangement shown. It will also be noted that, with the pistons of the equalizing device connected to the springs substantially centrally of the latter, the total vertical frame movement resulting from passage of the wheels over road irregularities is about one-half that of the wheels. This decreased frame movement is still further greatly reduced by spring deflection and by compression of the gas in the cylinders.

In the suspension shown in Figure 2 the form of Figure 1 is modified by substituting substantially rigid beams for the spring beams 15 and by substituting a pulsation reservoir of relatively great volumetric capacity for the piping conduit 22. Each rigid beam 23 is oscillatable about a pivot 24 carried by a bracket 25 riveted on the frame, and at its axle-supported end it is shaped to provide a semi-cylindrical housing 26 which cooperates with a detachable semi-cylindrical cap 27 to house a doughnut shaped block 28 of deformable material, such as rubber, which block engages the axle and cushions it against shock. Each block 28 is formed from split sections, as indicated, in order that it may be conveniently inserted, and the assembly is held together by bolts 29. The rubber blocks permit one end of an axle to tilt with respect to the other, without imposing any substantial twist upon the associated beams 23.

The pneumatic equalizer comprises piston rods 19 each pivotally connected at one end, as at 31, to an intermediate portion of a beam 23, and connected at its other end to a piston 32 by a transverse wrist pin 33. The pistons are adapted to reciprocate vertically in cylinders 34 that are rigidly attached to the frame as indicated at 35. A reservoir 36 of relatively large volumetric capacity is mounted at the side of the frame between the cylinders and in communication with the pair of cylinders by way of a pair of small pipes or conduits 37. The reservoir and cylinders are preferably charged with a gas, under sufficient pressure to support the load. The operation of this form of suspension is similar to that of Figure 1, except that the large pulsation reservoir serves to further reduce the frame movement and to provide an intermediate gas-receiver for delaying and dampening the transmission of shocks from one axle to the other. Should both axles be subjected to simultaneous shocks, the latter would be in great part absorbed by the fluid of the reservoir instead of being transmitted to the frame.

The conduits 37 may be given such cross sectional area that they will be just large enough to permit shock-compressed gases to pass therethrough freely enough to provide sufficient cushioning and compensating action, and yet so restricted as to retard or dampen any tendency toward extremely rapid downward oscillation of the axles as the latter return toward the road surface after leaving it. In other words, the conduits 37 may be so restricted as to permit the pistons to rarify the gases above them when moving rapidly on their down strokes, and the energy of the compressed reservoir gases is not permitted to release itself immediately to restore the cylinder working space to full or normal compression.

The form of invention illustrated in Figure 3 is substantially the same as that of Figure 2, with the exception that the elastic equalizing device comprises a pivoted beam instead of a gas compression system. Shackles 38 take the place of the piston rods 19, and are pivotally connected, as at 39, to the respective ends of a spring beam 41. The central portion of the beam 41 carries a U-bolt saddle structure 42 which is journaled upon a trunnion 43 mounted on the frame by a rigid bracket 44. The beam is thus permitted to rock about the trunnion axis to equalize the load on the axles and to transmit shocks from one axle to the other. This is a three-point suspension,—that is to say, it is attached to the frame at three points comprising the two pins 24 and the single trunnion 43. When it involves a beam 41 of the leaf spring type its action is in general principle the same as those forms of Figures 1 and 2 and hence the latter may properly be considered as three-point types of compensating suspensions.

The only difference between the structures shown in Figures 3 and 4 is that in the latter the shackles 38 are done away with and replaced by rubber connectors for attaching the spring ends to the swinging rigid arms, which latter are modified to meet the change in design. Each rigid arm 45 has integrally formed thereon an upright housing 46 which is closed except for a slot 47 in one of its faces for permitting the free insertion of the end of the lowest leaf 48 of the spring beam 41. The inserted end of said leaf is embedded in a block 49 of resilient and deformable material such as rubber, the external surfaces of the block conforming substantially to the internal surfaces of the housing 46. This set-up may be made in several ways but the preferred method is to mold the rubber in the housing with an opening approximately the size of the end of leaf 48, and thereafter to project leaf 48 through slot 47 and force it into said opening to be gripped by the rubber.

The suspension just described functions in general like that of Figure 3, the only difference being that the rubber blocks 49 serve to cushion road shocks and, by virtue of their yielding resistance to relative spring and axle movement, also serve to dampen free oscillation of the rigid arms 45. Moreover, the substitution of rubber connectors for pivoted shackles eliminates the necessity for oiling shackle pivots.

Figure 5 illustrates a modification of the arrangements shown in Figures 3 and 4. This modified form is in all respects a three-point suspension like that of Figure 4, except for the following changes: The rigid arms 45 have been lengthened to such extent that one of them has its frame-pivoted end disposed directly beneath the spring trunnion 43. The bracket 44 of Figures 3 and 4 has been converted into a longer bracket 44' for carrying one of the pivots 24 as well as the trunnion 43. The construction thus has been simplified by the elimination of one of the brackets 25. The spring 41 has been shortened to bring the wheels as close together as possible thereby substantially eliminating drag when making turns. The greater lengths of arms 45 cause the axles to swing in more nearly vertical arcs, thus to reduce reciprocatory frame movement and to reduce spline shaft travel when the vehicle is encountering road irregularties.

The modification in Figure 6 represents a conversion of the three-point suspensions, previously described, into an equalizing one of the two-point type, viz, one in which the suspension is attached to rigid portions of the frame at only two points. Its rear tandem axle 12 is mounted in rubber blocks 28 carried by the end housing 26, 27 of a rigid arm 51. The arm is mounted intermediate its ends for oscillation about a pivot 52 carried on a frame bracket 53. The forward end of the arm terminates in a T-shaped tip 54 and projects freely through a slot 55 into the interior of a box-like shackle housing 56 which, together with an upright integral lug 57 thereon, forms a special and improved type of shackle. The T-tip 54 is yieldingly held in position within the housing 56 by a molded body of rubber 58.

A beam 59, shown for purposes of illustration as a spring beam, is clamped intermediate its ends to the forward tandem axle by means of a U-bolt assembly 61. The rear end of beam 59 is pivoted, as at 62, to the upper end of shackle lug 57. At its front end the spring 59 has the ends of its two upper leaves bent at opposing right angles to form a T-shaped tip 63 similar to the tip 56 of rigid arm 51. Tip 63 projects into a housing 64 and is embedded in a rubber body 65 in the same manner that tip 54 is retained in housing 56. Instead of a shackle lug, however, the housing 64 carries a rigid and integral bracket 66 secured to the frame in the manner indicated.

As in Figure 5, this form permits structural simplification by elimination of one of the three brackets used in Figures 3 and 4. Moreover, it has the further advantage that equalization is obtained without the usual equalizing or compensating lever, the rigid arm 51 serving this function as well as its usual function of acting as a supporting arm and radius rod. The rubber bodies 58 and 65, in addition to dampening, absorbing and cushioning the shocks transmitted from the road to the axles, are sufficiently yielding to prevent twisting of the spring beam about its longitudinal axis. That is to say, the spring beam is clamped to an axle and when one end of the latter tilts with respect to the other the spring partakes a slight bodily oscillation about its own axis. If the spring ends were held against such oscillation, as by conventional rigid shackles having horizontal pivots, the longer leaves of the spring would be twisted. The T-tips 54 and 63, and the resistance of the rubber as it yields, restrict the freedom of movement of front axle 12 so that the suspension may not be too flexible.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by U. S. Letters Patent is:—

1. In a vehicle, a plurality of pairs of wheels, a frame, interconnected pneumatic devices for supporting one end of said frame on some of said plurality of pairs of wheels, and means isolated from said pneumatic devices for supporting the other end of said frame on at least one other of said pairs of wheels.

2. In a vehicle, a plurality of wheels, a frame, springs connecting some of said wheels and said frame, and interconnected pneumatic devices connecting others of said wheels and said frame.

3. In a vehicle, a plurality of pairs of wheels, a frame, springs supporting one end of said frame on a pair of said wheels, and interconnected pneumatic devices for supporting the other end of said frame on other pairs of said wheels.

4. In a vehicle, a plurality of pairs of wheels, a frame, interconnected pneumatic devices for connecting some of said pairs of wheels to said frame, and springs connecting at least one of said other pairs of wheels to said frame.

5. In a vehicle, a plurality of pairs of wheels, a frame, springs connecting at least one of said pairs of wheels to said frame at one side of the center of said frame, pneumatic devices connecting a plurality of the others of said pairs of wheels to said frame, and means permitting free fore and aft communication between said pneumatic devices.

6. In a vehicle, a frame, a pair of wheels at one end of said frame, resilient means connecting said pair of wheels to said frame, a plurality of pairs of wheels grouped at the other end of said frame, pneumatic devices on both sides of said frame for connecting said pairs of wheels to said frame, means permitting communication between said pneumatic devices on one side of said frame, and means permitting communication between said pneumatic devices on the other side of said frame.

7. In a multi-wheel vehicle construction, a plurality of tandem sets of wheels, a frame to be supported on said sets of wheels, a plurality of beams supported by said wheels, pneumatic devices connected to the beams intermediate the ends of the latter and attached to said frame to support it, and a relatively large reservoir through which direct communication is established between said pneumatic devices.

8. In a road vehicle, a frame, a plurality of pairs of wheels, a plurality of beams interconnecting certain of said wheels and one end of said frame, interconnected pneumatic devices connected to said beams intermediate the ends thereof, and attached to said one end of said frame to support the latter, and means isolated from said pneumatic devices for supporting the other end of said frame on at least one other of said pairs of wheels.

9. In combination with a vehicle chassis frame, a set of tandem axles disposed at one end of said frame, wheels supporting said axles, means at each side of the frame connecting said axles to said frame to permit them to swing and tilt as the vehicle passes over road irregularities, each of said means including an equalizing mechanism comprising pneumatic devices resisting the upward movement of said axles and interconnected by a pulsation reservoir of relatively great volumetric capacity through which fluid pulsations are transmitted from one device to another as the vehicle passes over road irregularities.

10. In a multi-wheel vehicle, a frame; a set of tandem axles disposed at one end of said frame; wheels supporting said axles; and a suspension system comprising substantially rigid longitudinal beams pivotally supporting said frame end, means connecting said beams to the axles in a manner permitting the latter to swing and tilt freely without subjecting said beams to twisting stresses, and equalizing devices interconnecting said beams to cushion and transmit road shocks from one beam to another; said devices being free of connection with the axles and thereby protected by said connecting means, and comprising interconnected fluid chambers rigidly mounted on the frame, and pistons slidably mounted within said chambers and flexibly connected to said rigid means.

ARTHUR I. MARCUM.